(12) United States Patent
Kuo et al.

(10) Patent No.: US 8,244,028 B2
(45) Date of Patent: Aug. 14, 2012

(54) VIRTUAL CEPHALOMETRIC IMAGING

(75) Inventors: Eric E. Kuo, San Jose, CA (US); Fabio Pettinati, Cupertino, CA (US); Sherri Wilson, Milpitas, CA (US)

(73) Assignee: Align Technology, Inc., San Jose, CA (US)

( * ) Notice: Subject to any disclaimer, the term of this patent is extended or adjusted under 35 U.S.C. 154(b) by 224 days.

(21) Appl. No.: 12/771,595

(22) Filed: Apr. 30, 2010

(65) Prior Publication Data

US 2011/0268326 A1 Nov. 3, 2011

(51) Int. Cl.
*G06K 9/00* (2006.01)
(52) U.S. Cl. ......................... 382/154; 382/128
(58) Field of Classification Search .................. 382/128, 382/154, 209, 218, 278; 345/419–420
See application file for complete search history.

(56) References Cited

U.S. PATENT DOCUMENTS

| 6,845,175 | B2 * | 1/2005 | Kopelman et al. ............. 382/154 |
| 7,077,647 | B2 * | 7/2006 | Choi et al. ...................... 433/24 |
| 2004/0038168 | A1 | 2/2004 | Choi et al. |
| 2005/0153255 | A1 * | 7/2005 | Sporbert et al. ................ 433/24 |
| 2007/0086762 | A1 * | 4/2007 | O'Keefe et al. ................ 396/16 |
| 2007/0197902 | A1 | 8/2007 | Schutyser |
| 2008/0124681 | A1 | 5/2008 | Cha |
| 2009/0003667 | A1 | 1/2009 | Cheng et al. |
| 2009/0311647 | A1 | 12/2009 | Fang et al. |

FOREIGN PATENT DOCUMENTS

| GB | 2440267 | 1/2008 |
| WO | 2007/130574 | 11/2007 |

OTHER PUBLICATIONS

International Search Report corresponding to International Patent Application PCT/IB2011/000903, mailing date Aug. 24, 2011.
Christou, Panaglotis, et al. "Vertical growth-related changes in the positions . . . ". Am. Journal of Orthod. and Dentofacial Orthoped., Jan. 2008, pp. 81-86.

* cited by examiner

*Primary Examiner* — Daniel Mariam
(74) *Attorney, Agent, or Firm* — Brooks, Cameron & Huebsch, PLLC (57) ABSTRACT

Virtual cephalometric imaging includes creating a first 3D virtual model and a second 3D virtual model of a patient's dentition. The first 3D virtual model is based on a first impression taken of the patient's dentition at a first time. The second 3D virtual model is based on a second impression taken of the patient's dentition at a second time. The first and the second 3D virtual models are correlated. A 2D image is generated including a first outline representing a position of at least one tooth of the patient's dentition according to the first 3D virtual model and a second outline representing a position of the at least one tooth according to the second 3D virtual model. Generating the 2D image includes positioning the first outline relative to the second outline according to the correlation of the first and the second 3D virtual models.

20 Claims, 8 Drawing Sheets

VIRTUAL CEPHALOMETRIC IMAGING

BACKGROUND

The present disclosure is related generally to the field of orthodontics. More particularly, the present disclosure is related to virtual cephalometric imaging.

Cephalometric analysis is the study of dental and skeletal relationships used by treatment professionals such as dentists and/or orthodontists as a treatment planning and/or evaluation tool using cephalometric imaging. Cephalometric imaging can include images such as X-rays, magnetic resonance images (MRI), computer aided tomography (CAT) scans, etc. Cephalometric imaging (and the analysis thereof) may be performed before, during, and/or after treatment of a patient.

A treatment professional may create cephalometric images of a patient's dentition and/or head. To compare a first and a second (e.g., a "before" and an "after") image, the treatment professional may apply a template (e.g., a plastic template) with outlines of teeth to a physical print of the first image. In some instances, both the image and the template may be on a 1:1 scale with the geometry of the patient's dentition. The treatment professional may modify (e.g., physically) the template to correlate the image.

The treatment professional may apply the template to the second image of the patient's dentition and/or head (e.g., physically place the template on a print of the second image). The treatment professional may select a number of features from the first image (e.g., a molar and an incisor) to outline and/or trace (e.g., with a pen) onto a second image (e.g., the "after" X-ray) using the template. After tracing the number of features from the first image to the second image, the treatment professional can compare changes to the patient's dentition resulting from treatment.

For instance, the treatment professional may study relationships between cephalometric landmarks such as nasion, orbital, point A, point B, pogonion, menton, gnathion, sella, porion, and gonion, etc. to determine various dental measurements such as overjet, overbite, tooth projection, tooth inclination, etc. as will be understood by one of ordinary skill in the art. The cephalometric analysis described above can be aided with the use of a computing device and digital copies of cephalometric images to help calculate angles and measurements.

DETAILED DESCRIPTION

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice a number of embodiments of this disclosure, and it is to be understood that other embodiments may be utilized and that process, electrical, or mechanical changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 220 may reference element "20" in FIGS. 2A-2B, and a similar element may be referenced as 320 in FIGS. 3A-3C. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense. As used herein, "a number of" something can refer to one or more such things.

Although the overarching term "orthodontics" is used herein, the present disclosure may relate to treatments of an orthognathic nature. For example, in cases including treatment of a patient's underlying skeletal structure, teeth may be rearranged by surgically repositioning underlying bones that hold the teeth in order to achieve a desired final bite arrangement. In both orthodontic and orthognathic treatment approaches, alignment of the teeth may be evaluated pre-, mid-, and/or post-treatment.

Figure 1:
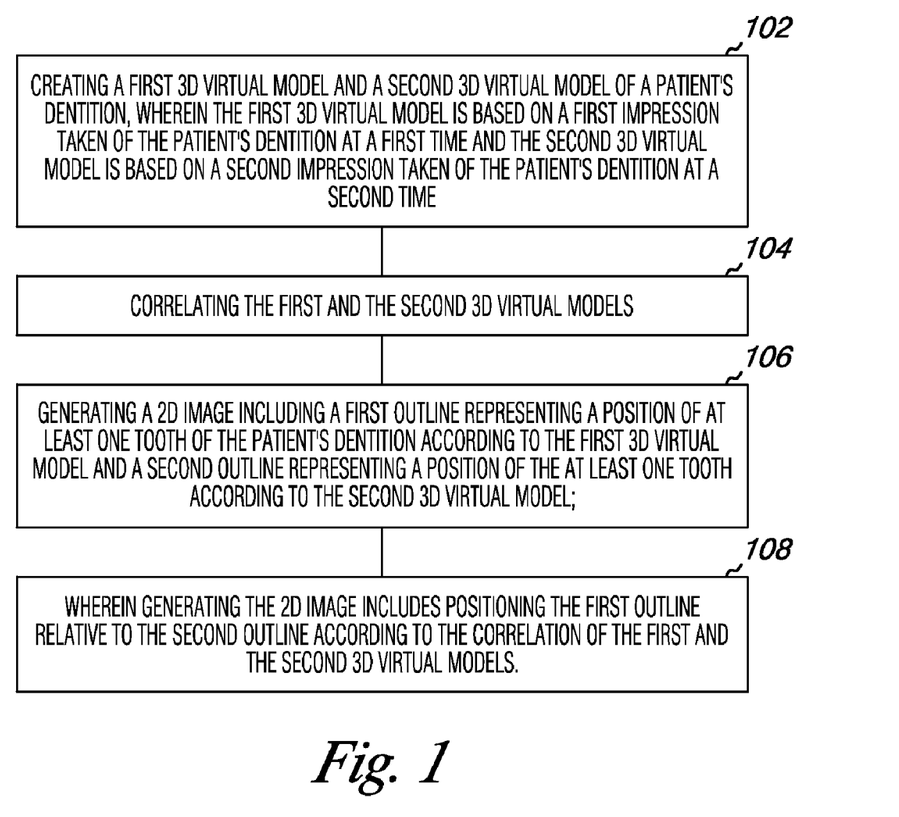
FIG. 1 is a flow chart illustrating a method for virtual cephalometric imaging according to one or more embodiments of the present disclosure.

Embodiments of the present disclosure include computing device related, system, and method embodiments for virtual cephalometric imaging. FIG. 1 is a flow chart illustrating a method for virtual cephalometric imaging according to one or more embodiments of the present disclosure. Methods for virtual cephalometric imaging can be implemented using a computing device.

Contrary to conventional cephalometric imaging, which may be based on images such as radiographs (e.g., X-rays), MRIs, CAT scans, etc. taken directly of a patient, virtual cephalometric imaging can be at least partially based on images taken of impressions of the patient's dentition, rather than of the patient himself. Thus, one or more embodiments of the present disclosure can provide a treatment professional with the ability to perform cephalometric analysis for a patient without having to expose the patient to drawbacks associated with imaging the patient directly. Such drawbacks could include radiation, financial burden, time consumption, and others.

Notwithstanding the above, embodiments of the present disclosure can also be practiced along with imaging a patient directly (e.g., X-raying). For example, a patient may undergo one or more initial images (e.g., a lateral headfilm), which may be used as a basis for further virtual imaging as described herein. However, one or more embodiments of the present disclosure enable virtual cephalometric imaging, and in particular, generation of a 2D cephalometric image without directly imaging the patient, when so desired by a treatment professional.

Virtual cephalometric imaging can include creating 102 a first 3D virtual model and a second 3D virtual model of a patient's dentition. The first 3D virtual model can be based on a first impression taken of the patient's dentition at a first time. The second 3D virtual model can be based on a second impression taken of the patient's dentition at a second time.

The second time can be later in time than the first time. For example, the first time can be near the beginning of patient treatment and the second time can be near the end of patient treatment however embodiments are not so limited. The first and second impressions forming a basis for the first and second 3D virtual models can be taken at any point before, during, or after treatment according to a goal of the virtual cephalometric imaging and/or analysis to be performed. For example, a treatment professional may wish to evaluate a course of treatment for a patient prior to completion of the treatment or after completion of the treatment.

3D virtual models created from a scan of a patient's dentition can be provided with computer-aided tooth treatment systems. An initial digital data set (IDDS) representing an initial tooth arrangement may be obtained. The IDDS may be obtained in a variety of ways. For example, the patient's teeth may be imaged to obtain digital data using direct or indirect structured light, X-rays, three-dimensional X-rays, CAT images or data sets, MRIs, photographic reconstruction, and/or other imaging techniques.

An impression (e.g., a plaster cast and/or mold) of the patient's teeth may be scanned using an X-ray, laser scanner, destructive scanner, structured light, or other range acquisition system to produce the IDDS. The data set produced by the range acquisition system may be converted to other formats to be compatible with the software which is used for manipulating images within the data set, as described herein. The first and second 3D virtual models are described in more detail below in connection with FIGS. 2A and 2B.

Virtual cephalometric imaging can include correlating 104 the first and the second 3D virtual models. Prior to correlation, the first and second 3D virtual models, being generated independently, may not be spatially interrelated. Correlating the 3D virtual models can facilitate displaying the models simultaneously on a display of a computing device such that a user can visually identify differences between the models. For example, after correlation, one 3D virtual model can be superimposed on another 3D virtual model and displayed simultaneously (e.g., on a display of a computing device). Correlating the 3D virtual models can be beneficial by helping the computing device to calculate differences between the models (e.g., distances and/or angles between a point on the first 3D virtual model and a point on the second 3D virtual model both representing to a same point on the patient's actual dentition, albeit at different times).

Correlating can include aligning the first and the second 3D virtual models based on one or more references identified in each of the first and second 3D virtual models. For example, a cusp tip, alveolar ridge, etc. can be identified on each of the first and the second 3D virtual models and used to align the first and the second 3D virtual models according to an algorithm that adjusts one of the models so that the reference is in a same (or nearly same) position graphically for each of the first and the second 3D virtual models. Embodiments are not limited to the example correlation algorithm described above.

Correlating the first and second 3D virtual models can be performed automatically by a computing device or by the computing device with some manual user intervention. Manual intervention in correlating the first and the second 3D virtual models can include allowing the user to adjust a position of one of the first and the second 3D virtual models with respect to the other in six degrees of freedom (e.g., rotation and translation with respect to three axes). Correlating is described in more detail below with respect to FIGS. 3A-3C.

Virtual cephalometric imaging can include generating 106 a 2D image including a first outline representing a position of at least one tooth of the patient's dentition according to the first 3D virtual model and a second outline representing a position of the at least one tooth according to the second 3D virtual model. A user can select the at least one tooth via an input to a computing device. For example, the user can select opposing molars from an upper and lower jaw of the patient and opposing incisors from an upper and lower jaw of the patient.

Generating the 2D image can include positioning 108 the first outline relative to the second outline according to the correlation of the first and the second 3D virtual models. Generating the 2D image is described in more detail with respect to FIGS. 5A-5B.

Figure 2A:
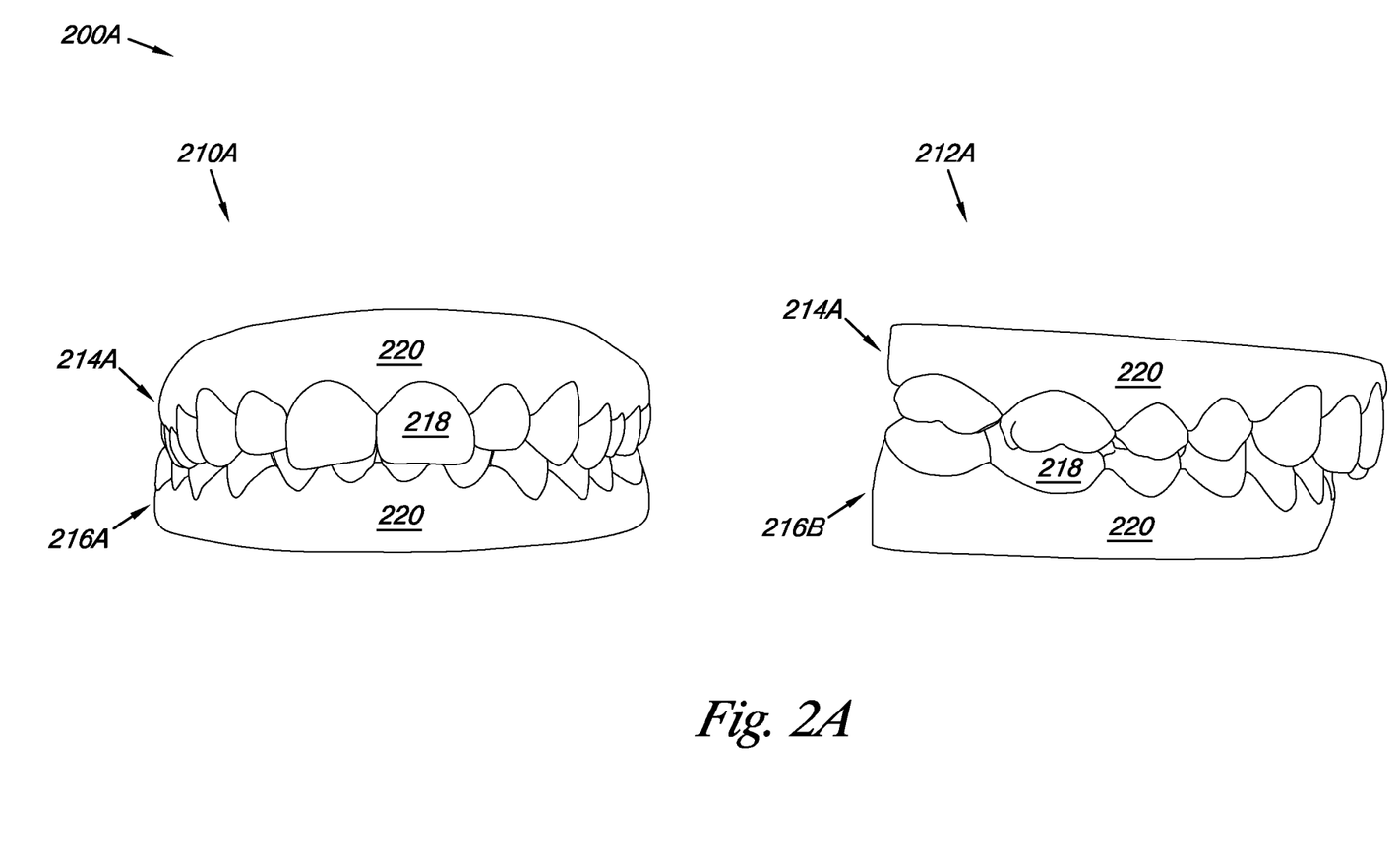
FIG. 2A illustrates a first virtual model of a patient's dentition according to one or more embodiments of the present disclosure.
Figure 2B:
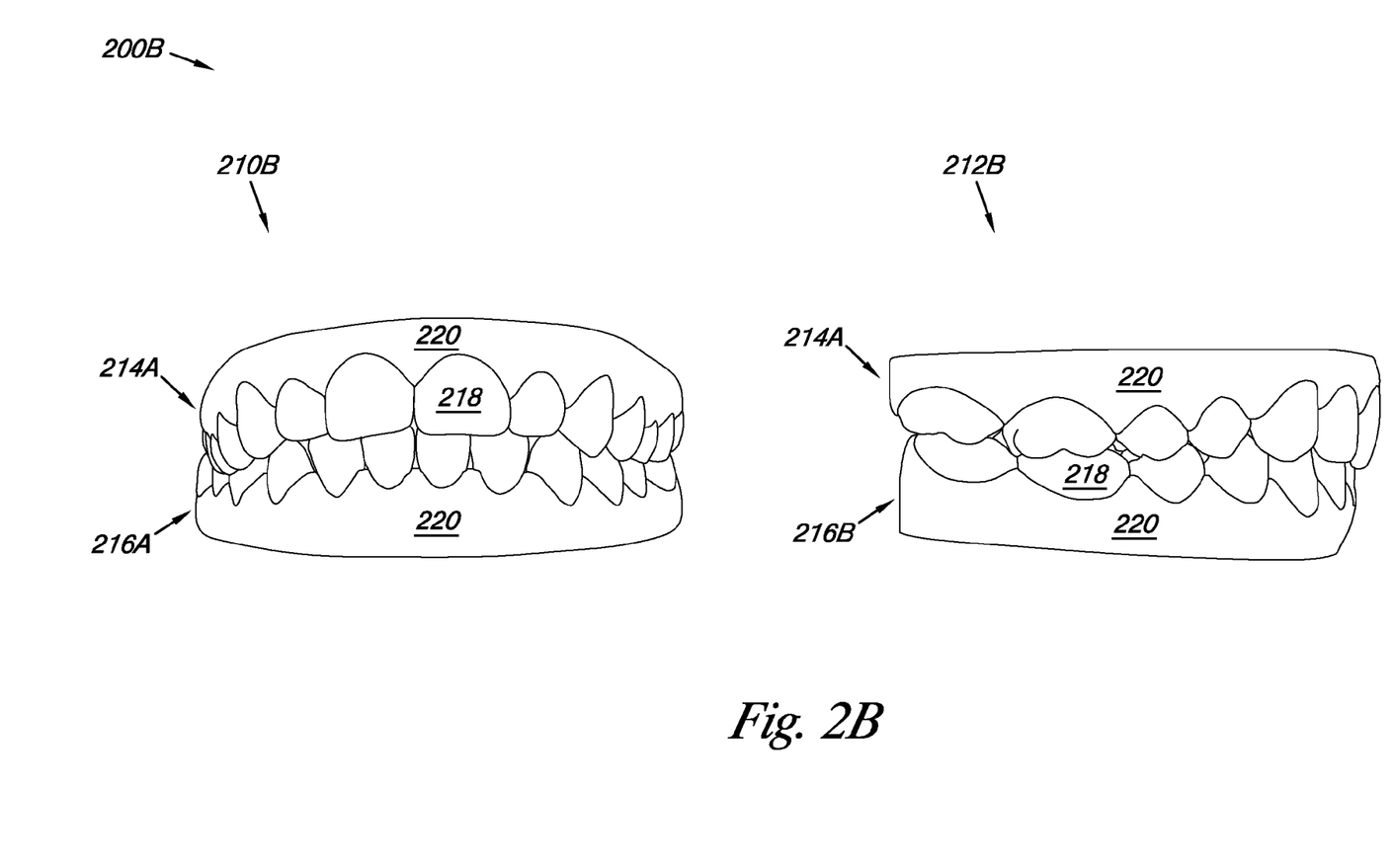
FIG. 2B illustrates a second virtual model of the patient's dentition according to the present disclosure.

Referring now to FIG. 2A, there is illustrated a first virtual model of a patient's dentition according to one or more embodiments of the present disclosure. FIG. 2B illustrates a second virtual model of the patient's dentition according to the present disclosure. The first 200A and the second 200B virtual models of the patient's dentition can be 3D models. The first 200A and second 200B 3D virtual models are illustrated in FIGS. 2A and 2B from a labial front view 210A, 210B and a buccal side view 212A, 212B. As described herein, the first virtual 3D model 200A can be based on a first impression taken of the patient's dentition at a first time and the second 3D virtual model 200B can be based on a second impression taken of the patient's dentition at a second time later than the first time.

Creating the first 200A and/or the second 200B 3D virtual models can include scanning an impression taken of a patient's dentition. Scanning the impression can include scanning a portion of the impression including a representation of soft tissue surrounding the patient's teeth such that the first 3D virtual model includes one or more 3D virtual soft tissue portions. Such soft tissue can include the patients gingiva, alveolar ridges (e.g., jaw ridges containing the tooth sockets), and/or palatal regions such as palatal rugae (e.g., ridges on the patient's palate). As used herein, "soft tissue" indicates surficial portions of an oral anatomy other than the teeth (e.g., bones) and thus can include the soft palate (e.g., tissue covering the hard palate), but not the palatine bone itself). The 3D virtual models can be processed to fill in bubbles and remove voids associated with acquisition of the 3D virtual models according to some scanning processes.

The first and/or the second impressions can include a cast of the patient's upper jaw and a cast of the patient's lower jaw. Accordingly, the first and/or the second 3D virtual models can include a 3D virtual model of the patient's upper jaw 214A, 214B and a 3D virtual model of the patient's lower jaw 216A, 216B. Initially, the first 200A and the second 200B 3D virtual models can include a 3D mesh with no distinction between soft tissue 220 (e.g., gingiva) and teeth 218.

The 3D mesh can include a set of points in space connected to each other forming a triangulation of the external surface geometry they represent. The 3D mesh can be an approximation of the original object from which it is derived (e.g., the patient's dentition). The accuracy of the approximation can be a function of the density of the triangles (e.g., how close the vertices are to each other). In some embodiments, 3D meshes according to the present disclosure can accurately represent the patient's dentition within a tolerance of 0.1 millimeters.

In some embodiments, the first 200A and/or the second 200B 3D virtual models can be segmented (e.g., cut) such that individual teeth 218 in the model are identified and distinguished from other teeth 218 and from the soft tissue 220. As illustrated, the 3D virtual teeth 218 in the first 200A and/or the second 200B 3D virtual models include the crowns of the teeth, but not the roots. Although not specifically illustrated, an unsegmented 3D virtual model would not include distinctions between individual teeth or between the teeth and soft tissue (e.g., the entire jaw would appear as one continuous surface). As casts of the patient's upper and lower jaws may be created and/or scanned separately, creating the first 200A and/or the second 200B 3D virtual models can include bite registering the 3D virtual models (e.g., the segmented models) of the patient's upper 214A, 214B and lower 216A, 216B jaws.

Bite registering may be performed by a number of methods using a variety of software algorithms and/or physical bite registration devices as will be appreciated by one of ordinary skill in the art. Bite registering may record the shape, location and orientation of the teeth of the upper jaw in relation to the teeth of the lower jaw when the jaws are in a given bite configuration.

One or more embodiments can include bite registering a segmented 3D virtual model of the patient's upper jaw 214A, 214B with a segmented 3D virtual model of the patient's lower jaw 216A, 216B. The segmented 3D virtual model of the patient's upper jaw 214A, 214B can be position-locked to the segmented 3D virtual model of the patient's lower jaw 216A, 216B. Position-locking two different 3D virtual models can include spatially fixing the two different 3D virtual models with respect to each other (e.g., such that any translation and/or rotation of one of the two different 3D virtual models causes a same translation and/or rotation of the other of the two different 3D virtual models). An unsegmented 3D virtual model of the patient's lower jaw can be position-locked to a segmented 3D virtual model of the patient's lower jaw 216A, 216B. In some embodiments, an unsegmented 3D virtual model of the patient's upper jaw is not position-locked to a segmented 3D virtual model of the patient's upper jaw 214A, 214B.

Such embodiments can be useful in effectively bite registering an unsegmented 3D virtual model of the patient's upper jaw with an unsegmented 3D virtual model of the patient's lower jaw. Such embodiments can also be useful in effectively superimposing the first 3D virtual model 200A of the patient's lower jaw 216A, 216B with the second 3D virtual model 200B of the patient's lower jaw 216A, 216B by way of superimposition of references identified on the first 200A and/or second 200B 3D virtual models of the patient's upper jaw 214A, 214B as described in more detail with respect to FIGS. 3A-3C. Position-locking is also described in more detail with respect to FIGS. 3A-3C.

Figure 3A:
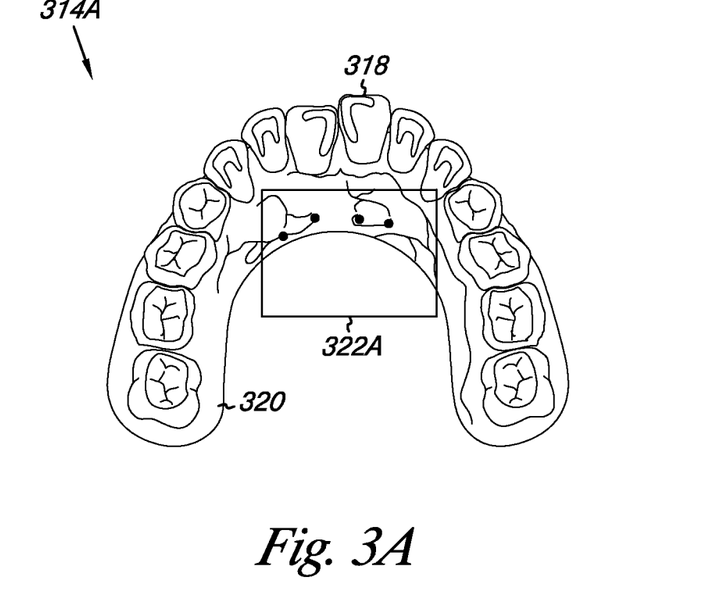
FIG. 3A illustrates the upper jaw of the first virtual model corresponding to the first virtual model in FIG. 2A including a first number of points identified on a portion of the model corresponding to the patient's soft tissue according to one or more embodiments of the present disclosure.
Figure 3B:
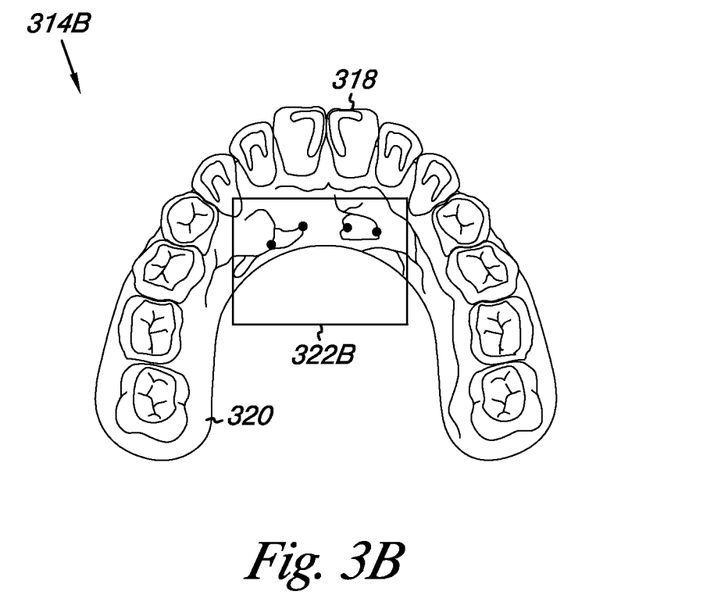
FIG. 3B illustrates the upper jaw of the second virtual model corresponding to the second virtual model in FIG. 2B including a second number of points identified on a portion of the model corresponding to the patient's soft tissue according to one or more embodiments of the present disclosure.

FIG. 3A illustrates the upper jaw of the first virtual model corresponding to the first virtual model in FIG. 2A including a first number of points identified on a portion of the model corresponding to the patient's soft tissue according to one or more embodiments of the present disclosure. FIG. 3B illustrates the upper jaw of the second virtual model corresponding to the second virtual model in FIG. 2B including a second number of points identified on a portion of the model corresponding to the patient's soft tissue according to one or more embodiments of the present disclosure.

Creating the first and/or the second 3D virtual models can include segmenting the 3D virtual models into one or more individual 3D virtual teeth 318 and one or more 3D virtual soft tissue portions 320 (e.g., virtual palatal regions). As illustrated, the 3D virtual teeth 318 in the first 314A and/or the second 314B 3D virtual upper jaws include the crowns of the teeth, but not the roots.

Correlating the first and the second 3D virtual models can include identifying a first number of points 322A on a portion of the first 3D virtual model corresponding the patient's soft tissue 320 (e.g., palatal rugae). A second number of points 322B can be identified on the second 3D virtual model corresponding to the patient's soft tissue 320 (e.g., palatal rugae). The first number of points 322A identified on the first 3D virtual model and the second number of points 322B identified on the second 3D virtual model can represent same points on the patient's actual palatal rugae. The first number of points 322A and the second number of points 322B can be superimposed using a geometric transformation and a best fit algorithm.

Superimposing the first and the second 3D virtual models can include minimizing the positional differences between common features in both models (e.g. the first 322A and second 322B numbers of points). Such palatal features indicated by first 322A and second 322 numbers of points can remain relatively stationary during orthodontic treatment (e.g., relative to the patient's teeth). A superimposition algorithm (e.g., including the geometric transformation and/or best fit algorithm) can move the first and second 3D virtual models in six degrees of freedom to find a relative position where a greatest percentage of the first number of points 322A spatially match corresponding points of the second number of points 322B.

In particular, the superimposition algorithm can calculate a distance between a particular vertex of the 3D mesh of the first 3D virtual model and a corresponding vertex of the second 3D virtual model (e.g., 3D virtual upper jaws 314A and 314B). In some embodiments, the superimposition algorithm can do this for all corresponding vertices between the first and the second 3D virtual models. The two meshes can be moved with respect to each other (e.g., via geometric transformation) until a transformation is found that minimizes the sum of all such distances, which can reflect the best superimposition of the first and the second 3D virtual models. However, embodiments are not so limited, as in some embodiments a superimposition weight metric can be assigned to various portions of the 3D virtual models as described herein.

In one or more embodiments, a user can indicate the first 322A and/or the second 322B number of points via an input to a computing device. In some embodiments, the user can indicate the first number of points 322A on the first 3D virtual model of the patient's upper jaw 314A and the first number of points 314A can be translated to a corresponding second number of points 322B on the second 3D virtual model of the patient's upper jaw 314B by an algorithm running on the computing device. In some embodiments, an algorithm running on the computing device can automatically identify appropriate surface features and automatically select both the first 322A and the second 322B numbers of points (e.g., independently or by selecting one of the first 322A and the second 322B numbers of points and translating the same to the other 3D virtual model).

Figure 3C:
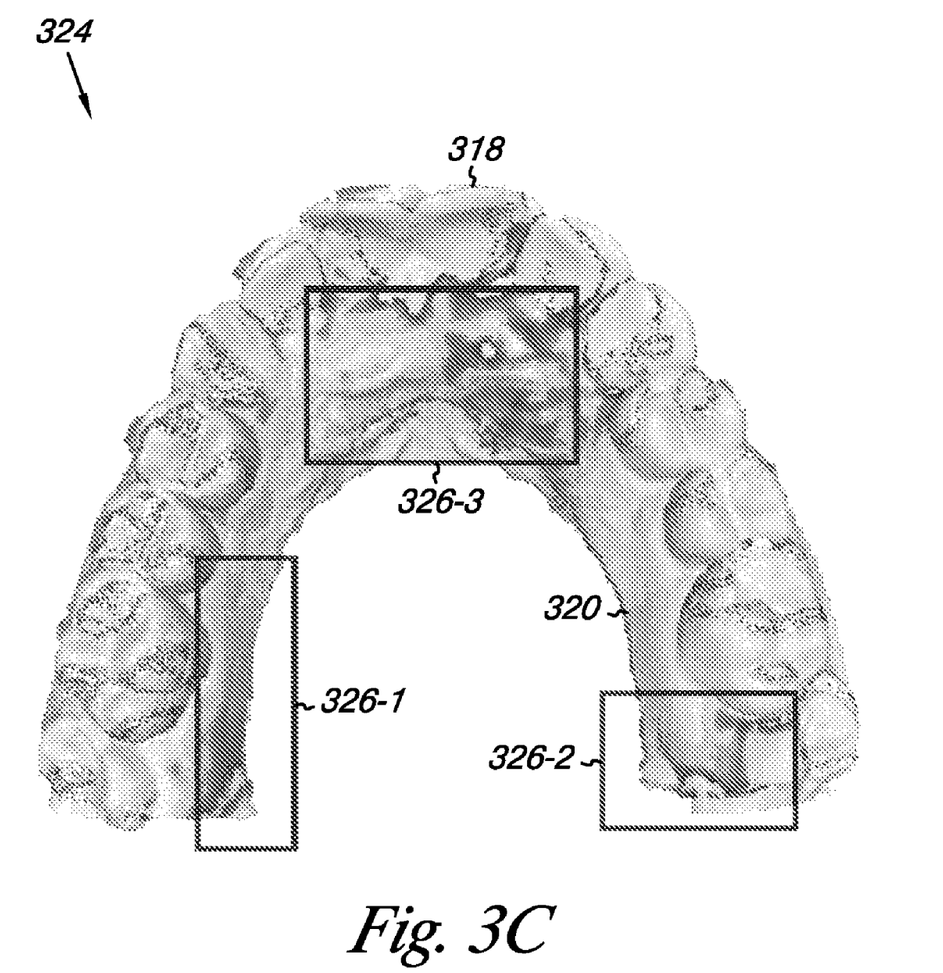
FIG. 3C illustrates the upper jaw of the first virtual model corresponding to the first virtual model in FIG. 2A superimposed on the second virtual model corresponding to the second virtual model in FIG. 2B including visual cues as to a quality of correlation according to one or more embodiments of the present disclosure.

FIG. 3C illustrates the upper jaw of the first virtual model corresponding to the first virtual model in FIG. 2A superimposed on the second virtual model corresponding to the second virtual model in FIG. 2B including visual cues as to a quality of correlation according to one or more embodiments of the present disclosure. FIG. 3C is a grayscale duplication of a color image including visual cues 326-1, 326-2, 326-3 represented by different colors as to the quality of correlation between the first and second 3D virtual models according to the superimposition 324 thereof. In the grayscale image, better correlation is visually indicated by a darker shade of gray and poorer correlation is indicated by a lighter shade of gray.

The quality of superimposition 324 can be determined by calculating a distance between a particular vertex of the 3D mesh of the first 3D virtual model and a corresponding vertex of the second 3D virtual model after superimposition 324. The distribution of distances between various corresponding vertices can be represented visually (e.g., by different colors, shading, etc.). For example, a first color can indicate "good" superimposition for distances less than 0.5 millimeters, a second color can represent "moderate" superimposition for distances between 0.5 and 0.6 millimeters, and a third color can represent "poor" superimposition for distances greater than 0.6 millimeters. Embodiments are not limited to this example and can include more or fewer colors (or other identifiers) and different distances corresponding to "good," "moderate," "poor," and/or other qualities of superimposition.

A superimposition algorithm can use the segmented 3D virtual models to remove (e.g., mask) the 3D virtual teeth 318 from consideration during superimposition of the first and the second 3D virtual models. At least one geometric transformation can be applied to the first 3D virtual model to superimpose the one or more 3D virtual soft tissue portions 320 of the first 3D virtual model with the one or more 3D virtual soft tissue portions 320 of the second 3D virtual model. In some embodiments, a series of geometric transformations can be applied to aid superimposition.

A superimposition metric can be assigned to a number of 3D virtual soft tissue portions 320 of a 3D virtual model. A lower weight superimposition metric can be assigned to a first 3D virtual soft tissue portion that is proximal to at least one of the one or more individual 3D virtual teeth 318. A higher weight superimposition metric can be assigned to a second 3D virtual soft tissue portion that is distal to the at least one of the one or more individual 3D virtual teeth 318.

In particular, a lower superimposition metric can be assigned to portions of the 3D virtual soft tissue that are proximal to 3D virtual teeth 318 that have moved during treatment as such movement may also cause changes to soft tissue proximate to the moving teeth. A divergent superimposition result of the at least one geometric transformation between the first and the second 3D virtual soft tissue portions 320 can be resolved in favor of the 3D virtual soft tissue portion having the higher weight superimposition metric assigned thereto.

In one or more embodiments, a superimposition algorithm can employ the 3D graphics hidden-surface algorithms present in OpenGL instead of calculating distances between vertices of the 3D meshes. For example, the superimposition algorithm can calculate distances between only those vertices that are visible from a current virtual camera position rather than calculating distances between all vertices of the meshes. Virtual camera positioning is described in more detail herein.

Such embodiments can be beneficial in reducing computing device workload for processing the superimposition algorithm. For example, such embodiments can reduce the workload by more than half because, on average, less than half of the vertices of a given mesh for a 3D virtual model may be visible from an applicable virtual camera position.

In various embodiments, a superimposition algorithm can project lines passing through pixels of the image of the 3D virtual models on screen (e.g., from the virtual camera vantage point) and determine where the lines intersect the two meshes (e.g., of the first and the second 3D virtual models). The distance between intersections can provide a reasonable approximation of the quality of correlation between the first and second 3D virtual models.

In some embodiments, the first or the second 3D virtual models can be correlated without correlating 3D virtual teeth 318 of either the first or the second 3D virtual models. The patient's teeth are likely to move more significantly that the patient's soft tissue. Accordingly, correlating models of the patient's dentition at different times during treatment can be more accurately accomplished using references associated with soft tissue rather than teeth.

Correlating can include displaying the first 3D virtual model superimposed 324 with the second 3D virtual model along with a number of visual cues 326-1, 326-2, 326-3 as to a quality of the correlation. The quality of the correlation can be based on a distribution of distances between at least one of the one or more 3D virtual soft tissue portions 320 of the first 3D virtual model and at least one of the one or more 3D virtual soft tissue portions 320 of the second 3D virtual model.

For those embodiments including some degree of manual user intervention, correlating can include displaying the superimposed 324 first and second virtual models with the number of visual cues 326-1, 326-2, 326-3 displayed by the computing device. The number of visual cues 326-1, 326-2, 326-3 can be dynamic, in that as the user (or algorithm for automatic correlation) adjusts one or more of the 3D virtual models, the visual cues 326-1, 326-2, 326-3 change to indicate better or worse correlation according to the adjustments. In some embodiments, one or more of the 3D virtual models can be displayed with a variable degree of opacity to allow a user to more easily identify superimposition. Some embodiments can include automatic correlation performed by a superimposition algorithm followed by manual user intervention for fine tuning the correlation.

Figure 4:
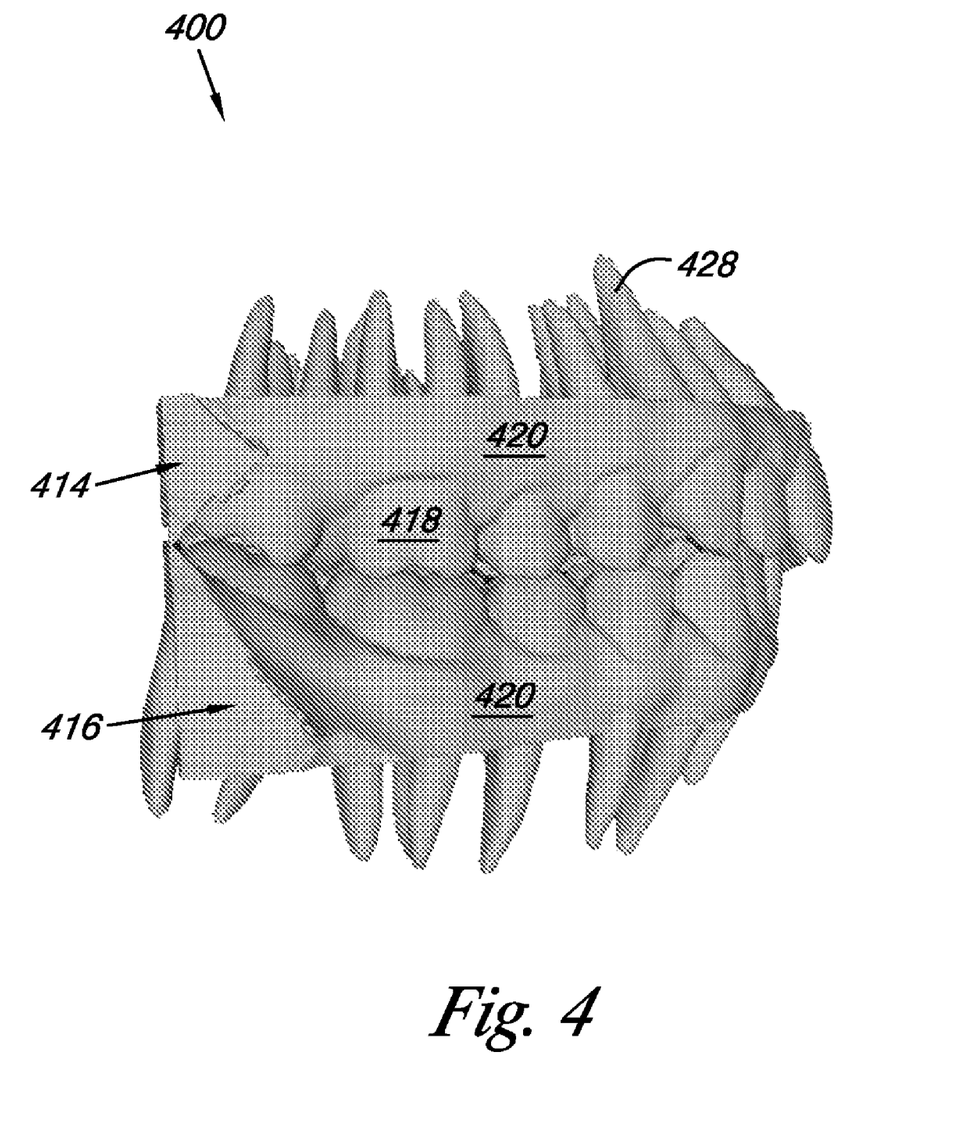
FIG. 4 illustrates a virtual model of the patient's dentition including a number of virtual roots according to the present disclosure.

FIG. 4 illustrates a virtual model of the patient's dentition including a number of virtual roots according to the present disclosure. The 3D virtual model 400 can include a 3D virtual upper jaw 414 and a 3D virtual lower jaw 416 as described herein. The 3D virtual model can be segmented to include individual 3D virtual teeth 418 and 3D virtual soft tissue portions 420. As illustrated, the 3D virtual teeth 418 in the 3D virtual model 400 include the crowns of the teeth.

The number of 3D virtual roots 428 can be generated for one or more individual 3D virtual teeth 418 of a 3D virtual model 400 based on a reference library of statistical shape information collected for a number of prior dentition samples. The number of 3D virtual roots 428 can approximate the shape, position, and size of actual roots of the patient.

In one or more embodiments, the 3D virtual roots 428 can be generated for the first 3D virtual model (e.g., the first 3D virtual model 200A illustrated in FIG. 2A) then projected from the first 3D virtual model to the second 3D virtual model (e.g., the second 3D virtual model 200B illustrated in FIG. 2B).

In some embodiments, the 3D virtual roots 428 can be generated for the first 3D virtual model and subsequently, the individual 3D virtual teeth 418 of the second 3D virtual model can be replaced with the individual 3D virtual teeth 418 and generated 3D virtual roots 428 of the first 3D virtual model in an orientation matching an orientation of the one or more teeth 418 of the second 3D virtual model.

While 3D virtual roots 428 generated according to embodiments of the present disclosure may not be used for actual clinical work related to adjusting the patient's dentition, the 3D virtual roots 428 can be sufficiently representative of the patient's actual roots in order to enable virtual cephalometric imaging and/or analysis. For example, the generated 3D virtual roots 428 can be more accurate than roots drawn by manual tracing methods employing cutout templates according to some previous approaches to cephalometric analysis.

Figure 5A:
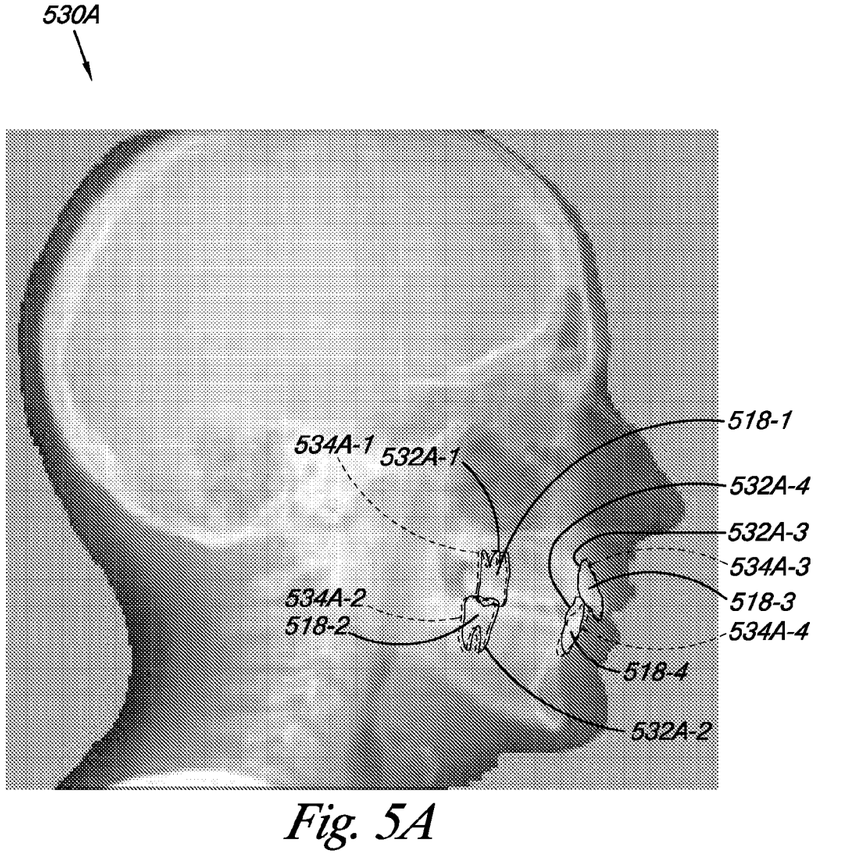
FIG. 5A illustrates an image including outlines representing positions of the patient's teeth according to the first and the second virtual models according to one or more embodiments of the present disclosure.
Figure 5B:
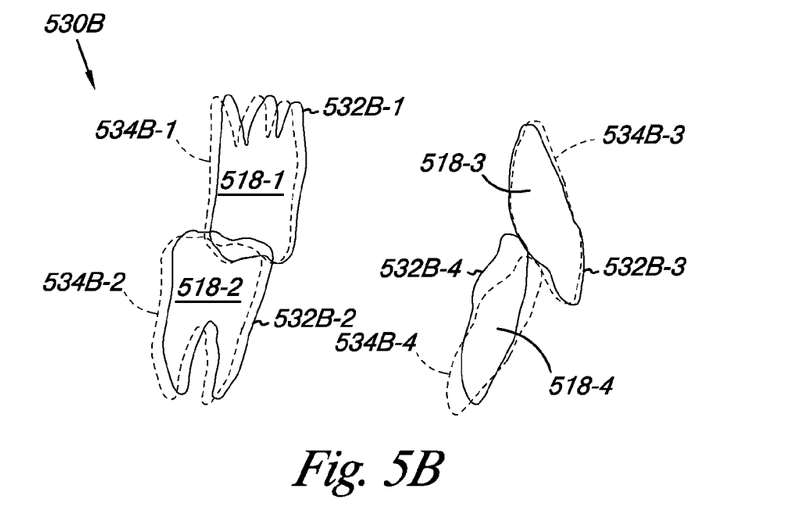
FIG. 5B illustrates an image corresponding to the image in FIG. 5A including only outlines representing positions of the patient's teeth according to the first and the second virtual models according to one or more embodiments of the present disclosure.

FIG. 5A illustrates an image including outlines representing positions of the patient's teeth according to the first and the second virtual models according to one or more embodiments of the present disclosure. FIG. 5B illustrates an image corresponding to the image in FIG. 5A including only outlines representing positions of the patient's teeth according to the first and the second virtual models according to one or more embodiments of the present disclosure.

The 2D virtual image 530A and/or 530B can be a 2D image including a first outline (e.g., outline 532A-1, 532B-1) representing a position of at least one tooth (e.g., tooth 518-1) of the patient's dentition according to the first 3D virtual model and a second outline (e.g., outline 534A-1, 534B-1) representing a position of the at least one tooth (e.g., tooth 518-1) according to the second 3D virtual model. As will be appreciated, the 2D outlines 532A-1, 532A-2, 532A-3, 532A-4, 534A-1, 534A-2, 534A-3, 534A-4 in the 2D virtual image 530A and the 2D outlines 532B-1, 532B-2, 532B-3, 532B-4, 534B-1, 534B-2, 534B-3, 534B-4 in the 2D virtual image 530B can include both the crowns and roots of the teeth 518-1, 518-2, 518-3, and 518-4.

Some embodiments can include displaying the first outline in a first color and displaying the second outline in a second color. In the 2D virtual images 530A, 530B outlines 532A-1, 532A-2, 532A-3, 532A-4, and 532B-1, 532B-2, 532B-3, 532B-4 corresponding to 3D virtual teeth 518-1, 518-2, 518-3, and 518-4 of the first 3D virtual model are indicated by a solid line. Outlines 534A-1, 534A-2, 534A-3, 534A-4, and 534B-1, 534B-2, 534B-3, 534B-4 corresponding to teeth 518-1, 518-2, 518-3, and 518-4 of the second 3D virtual model are indicated by a dashed line.

Although the 2D image 530A is illustrated with the outlines mapped to a radiograph (e.g., a headfilm), embodiments are not limited to such displays. As illustrated in FIG. 5B, the outlines can be displayed without being mapped to a radiograph (e.g., for example embodiments that do not include taking a radiograph of the patient). However, for embodiments that include taking a radiograph of the patient, the outlines can be mapped to the same to allow the treatment professional to visualize and/or perform cephalometric tracings in a manner resembling the traditional approach (e.g., placing a template over a radiograph of the patient).

In one or more embodiments, the number of outlines displayed in the 2D virtual image 530A, 530B can be controlled by a user selection of one or more teeth via an input to a computing device. The user can select teeth from the upper arch and/or lower arch. The user can select whether to display the 2D virtual image 530A, 530B from the left side, right side, or front of the dentition. Embodiments of the present disclosure can automatically distinguish left and right sides (e.g., whether a particular tooth is from the left or right side of the patient's dentition). In traditional cephalometrics distinguishing the left from the right side based on a radiograph can be difficult (e.g., a #30 tooth could be mistaken for a #19 tooth due to overlap).

A virtual camera can be placed according to the user's selection of viewpoint and/or teeth for generating the 2D virtual image. Positioning the virtual camera can include defining a midplane corresponding to a plane that would be equivalent to a lateral headfilm if the patient were to have radiographs (e.g., X-rays) taken.

The 2D virtual outlines can be generated from the appropriate 3D virtual model according to positioning of the virtual camera. The virtual camera can define a plane in the appropriate 3D virtual model and an outline of one or more teeth can be generated as they appear in the plane. An edge-finding operator can be applied to the 3D virtual model from the perspective of the virtual camera to generate and outline of a tooth. In some embodiments, an output of the edge-finding operator can be blurred (e.g., via a Gaussian blur operator) to produce a smoother 2D virtual outline image.

As described herein, the 2D virtual outlines can include both the crown and root (e.g., the root generated as described with respect to FIG. 4) of the teeth. Accordingly, the displayed 2D virtual outlines can be analogous to pre-made cutout templates for tracing around tooth images on an x-ray plate according to some previous approaches to cephalometric analysis. However, one or more embodiments of the present disclosure are advantageous over some previous approaches at least because the use of 3D virtual models to generate the 2D virtual image allows the user to visualize tooth rotations along different axes whereas some previous approaches rely on predetermined crown-root shapes and only account for translations and rotations perpendicular to the display surface (e.g., x-ray film).

In one or more embodiments of the present disclosure, generating the 2D image can include positioning a virtual camera facing the first and the second 3D virtual models and positioning a virtual directional light behind the first and the second 3D virtual models facing the virtual camera. Any ambient virtual light can be turned off so that the 3D virtual models are illuminated solely by the virtual directional light. Portions of the first and the second 3D virtual models other than the at least one tooth can be removed and the 2D image can be rendered including the at least one tooth according to the first 3D virtual model superimposed with the at least one tooth according to the second 3D virtual model.

In some embodiments, generating the 2D virtual image can include rendering the 2D virtual image of both the first and the second 3D virtual models (e.g., including both upper and lower segmented jaws) simultaneously. In various embodiments, generating the 2D virtual image can include rendering the 2D virtual image of the first and the second 3D virtual models independently. In some embodiments, generating the 2D virtual image can include rendering the 2D virtual image of each segmented jaw of each of the first and the second 3D virtual models independently. For those embodiments using independent rendering of various 3D virtual models (or components thereof), the independent renderings can be combined into a composite 2D virtual image.

Independent rendering of upper and lower jaws of each 3D virtual model can help ensure that the selected teeth have properly calculated outlines. Such embodiments can also allow for outlines of teeth in one jaw to visually intersect outlines from teeth in another jaw (e.g., as illustrated in 2D virtual images 530A and 530B).

One or more embodiments of the present disclosure can provide for automatic cephalometric measurement and/or analysis. For example, the computing device can determine the physical relationships between cephalometric landmarks such as nasion, orbital, point A, point B, pogonion, menton, gnathion, sella, porion, and gonion, etc. to determine various dental measurements such as overjet, overbite, tooth projection, tooth inclination, etc. as will be understood by one of ordinary skill in the art.

Figure 6:
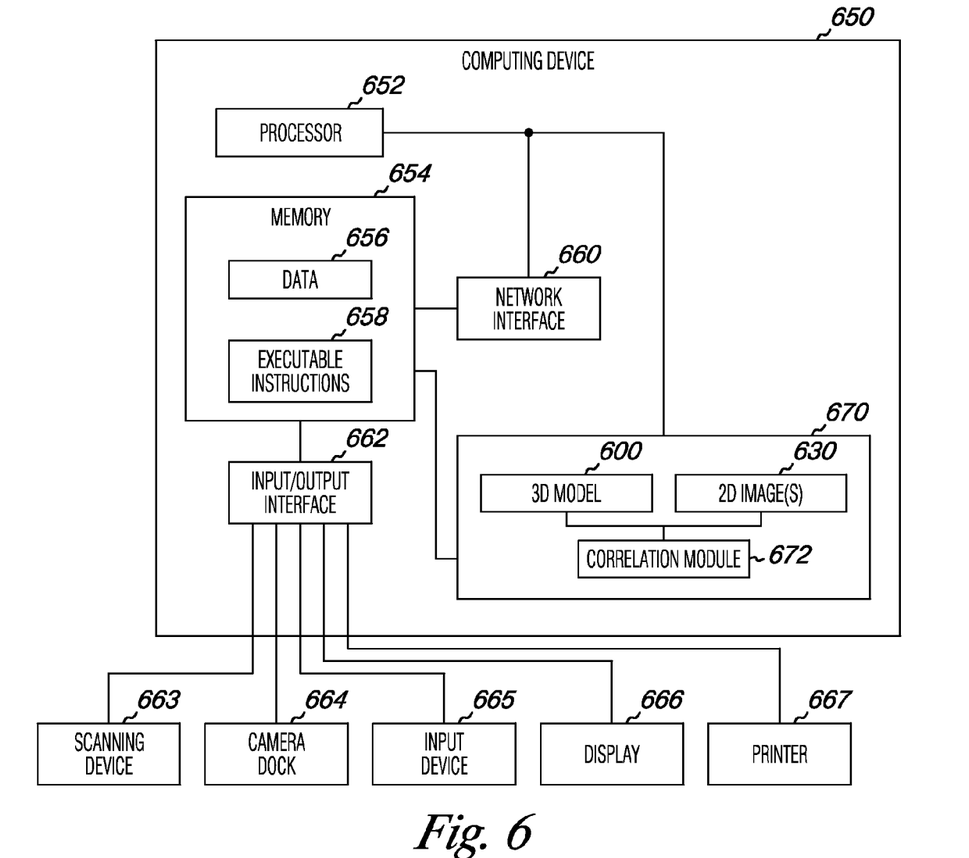
FIG. 6 illustrates a system for virtual cephalometric imaging according to one or more embodiments of the present disclosure.

FIG. 6 illustrates a system for virtual cephalometric imaging according to one or more embodiments of the present disclosure. The system illustrated in FIG. 6 includes a computing device 650 having a number of components coupled thereto. The computing device 650 includes a processor 652 and memory 654. The memory can include various types of information including data 656 and executable instructions 658 (e.g., fixed a non-transitory computer readable medium) as discussed herein.

Memory and/or the processor may be located on the computing device 650 or off the device in some embodiments. As such, as illustrated in the embodiment of FIG. 6, a system can include a network interface 660. Such an interface can allow for processing on another networked computing device or such devices can be used to obtain information about the patient or executable instructions for use with various embodiments provided herein.

As illustrated in the embodiment of FIG. 6, a system can include one or more input and/or output interfaces 662. Such interfaces can be used to connect the computing device with one or more input or output devices.

For example, in the embodiment illustrated in FIG. 6, the system can include connectivity to a scanning device 663, a camera dock 664, an input device 665 (e.g., a keyboard, mouse, etc.), a display device 666 (e.g., a monitor), a printer 667, and one or more other input devices 665. The input/output interface 662 can receive data, storable in the data storage device (e.g., memory 654).

In some embodiments, the scanning device 663 can be configured to scan one or more impressions of a patient's dentition. In one or more embodiments, the scanning device 663 can be configured to scan the patient directly. The scanning device 663 can be configured to input data to the application modules 670.

The camera dock 664 can receive an input from an imaging device (e.g., a two-dimensional imaging device) such as a digital camera or a printed photograph scanner. The input from the imaging device can be stored in the data storage device (e.g., memory 654).

The processor 652 can be configured to provide a visual indication of a 3D virtual model 600 and/or a 2D virtual image 630 on the display 666 (e.g., on a GUI running on the processor 652 and visible on the display 666). For example, the GUI can be configured to allow a user (e.g., treatment professional) to identify a number of points on a 3D virtual model 600, select one or more teeth, and/or adjust a position of a 3D virtual model 600, etc. Input received via the GUI can be sent to the processor 652 as data and/or can be stored in memory 654.

Such connectivity can allow for the input and/or output of data and/or instructions among other types of information. Although some embodiments may be distributed among various computing devices within one or more networks, such systems as illustrated in FIG. 6 can be beneficial in allowing for the capture, calculation, and/or analysis of information discussed herein.

The processor 652, in association with the data storage device (e.g., memory 654), can be associated with data and/or application modules 670. The processor 652, in association with the memory 654, can store and/or utilize data and/or execute instructions to provide a number of application modules for virtual cephalometric imaging.

Such data can include a number of 3D virtual models 600 and/or a number of 2D virtual images, etc. The number of 3D virtual models 600 can be created based on scanning one or more impressions of a patient's dentition. The number of 2D virtual images can be generated according to the number of 3D virtual models as described herein.

Such application modules can include a correlation module 672. The correlation module 672 can be configured to correlate two or more 3D virtual models as described herein. For example, the correlation module 672 can be configured to apply a geometric transformation to a first 3D virtual model to superimpose one or more 3D virtual soft tissue portions of the first 3D virtual model with one or more 3D virtual soft tissue portions of a second 3D virtual model. The correlation module 672, and/or other application modules not specifically illustrated, can be configured to perform the various embodiments of virtual cephalometric imaging and/or analysis as described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device implemented method of virtual cephalometric imaging, comprising:
   creating a first 3D virtual model and a second 3D virtual model of a patient's dentition, wherein the first 3D virtual model is based on a first impression taken of the patient's dentition at a first time and the second 3D virtual model is based on a second impression taken of the patient's dentition at a second time;
   correlating the first and the second 3D virtual models;

generating a 2D image including a first outline representing a position of at least one tooth of the patient's dentition according to the first 3D virtual model and a second outline representing a position of the at least one tooth according to the second 3D virtual model; and wherein generating the 2D image includes positioning the first outline relative to the second outline according to the correlation of the first and the second 3D virtual models.

2. The method of claim 1, wherein creating the first 3D virtual model includes scanning the first impression, wherein:
the first impression includes a cast of the patient's upper jaw and a cast of the patient's lower jaw; and
the first 3D virtual model includes a 3D virtual model of the patient's upper jaw and a 3D virtual model of the patient's lower jaw.

3. The method of claim 2, wherein scanning the first impression includes scanning one or more portions of the first impression including a representation of soft tissue surrounding the patient's teeth such that the first 3D virtual model includes one or more 3D virtual soft tissue portions.

4. The method of claim 1, wherein the first time corresponds to an earlier time in treatment of the patient and the second time corresponds to a later time in treatment of the patient.

5. The method of claim 1, wherein creating the first 3D virtual model and the second 3D virtual model includes segmenting each of the first 3D virtual model and the second 3D virtual model into:
one or more individual 3D virtual teeth; and
one or more 3D virtual soft tissue portions.

6. The method of claim 5, wherein correlating includes applying at least one geometric transformation to the first 3D virtual model to superimpose the one or more 3D virtual soft tissue portions of the first 3D virtual model with the one or more 3D virtual soft tissue portions of the second 3D virtual model.

7. The method of claim 6, wherein correlating further includes:
assigning a lower weight superimposition metric to a first 3D virtual soft tissue portion that is proximal to at least one of the one or more individual 3D virtual teeth;
assigning a higher weight superimposition metric to a second 3D virtual soft tissue portion that is distal to the at least one of the one or more individual 3D virtual teeth;
resolving a divergent superimposition result of the at least one geometric transformation between the first and the second 3D virtual soft tissue portions in favor of the second 3D virtual soft tissue portion having the higher weight superimposition metric assigned thereto.

8. The method of claim 5, wherein the method includes generating a first number of 3D virtual roots for the one or more individual 3D virtual teeth of first 3D virtual model based on a reference library of statistical root shape information collected for a number of prior dentition samples, wherein the first number of 3D virtual roots approximate shape, position, and size of actual roots of the patient.

9. The method of claim 8, wherein the method includes projecting the first number of 3D virtual roots from the first 3D virtual model to the second 3D virtual model.

10. The method of claim 8, wherein the method includes replacing the one or more individual 3D virtual teeth of the second 3D virtual model with the one or more individual 3D virtual teeth and the first number of 3D virtual roots of the first 3D virtual model in an orientation matching an orientation of the one or more teeth of the second 3D virtual model.

11. The method of claim 6, wherein correlating further includes displaying the first 3D virtual model superimposed with the second 3D virtual model along with a number of visual cues as to a quality of the correlation according to a distribution of distances between at least one of the one or more 3D virtual soft tissue portions of the first 3D virtual model and at least one of the one or more 3D virtual soft tissue portions of the second 3D virtual model.

12. The method of claim 11, wherein correlating further includes allowing a user to manually adjust a position of one of the first and the second 3D virtual models with respect to the other of the first and the second 3D virtual models in six degrees of freedom.

13. The method of claim 1, wherein the first 3D virtual model includes a 3D virtual model of the patient's upper jaw and a 3D virtual model of the patient's lower jaw; and
wherein creating the first 3D virtual model includes bite registering the 3D virtual model of the patient's upper jaw with the 3D virtual model of the patient's lower jaw.

14. The method of claim 1, wherein correlating includes:
identifying a first number of points on a portion of the first 3D virtual model corresponding to the patient's palatal rugae;
identifying a second number of points on a portion of the second 3D virtual model corresponding to the patient's palatal rugae; and
superimposing the first and the second number of points using a geometric transformation and a best fit algorithm.

15. The method of claim 1, including correlating the first and the second 3D virtual models without correlating 3D virtual teeth of either the first 3D virtual model or the second 3D virtual model.

16. The method of claim 1, including generating the 2D image without directly imaging the patient.

17. The method of claim 1, wherein the method includes receiving a selection of the at least one tooth from a user input to the computing device.

18. The method of claim 1, wherein generating the 2D image includes displaying the first outline in a first color and displaying the second outline in a second color.

19. The method of claim 1, wherein generating the 2D image includes:
positioning a virtual camera facing the first and the second 3D virtual models;
positioning a virtual directional light behind the first and the second 3D virtual models facing the virtual camera;
removing portions of the first and the second 3D virtual models other than the at least one tooth; and
rendering the 2D image including the at least one tooth according to the first 3D virtual model superimposed with the at least one tooth according to the second 3D virtual model.

20. The method of claim 19, wherein positioning the virtual camera includes defining a plane of the 2D image that would be equivalent to a lateral headfilm if the patient were to have radiographs taken.

* * * * *